(12) United States Patent
Hasegawa

(10) Patent No.: US 11,570,313 B2
(45) Date of Patent: Jan. 31, 2023

(54) IMAGE FORMING APPARATUS, INFORMATION PROCESSING APPARATUS, METHOD OF CONTROLLING IMAGE FORMING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Teppei Hasegawa, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/074,081

(22) Filed: Oct. 19, 2020

(65) Prior Publication Data

US 2021/0037148 A1 Feb. 4, 2021

Related U.S. Application Data

(63) Continuation of application No. 15/614,188, filed on Jun. 5, 2017, now Pat. No. 10,841,436.

(30) Foreign Application Priority Data

Jun. 7, 2016 (JP) .................................. 2016-113723

(51) Int. Cl.
*H04N 1/00* (2006.01)
*G06F 3/12* (2006.01)
(52) U.S. Cl.
CPC ......... *H04N 1/00204* (2013.01); *G06F 3/121* (2013.01); *G06F 3/1203* (2013.01); *G06F 3/1234* (2013.01); *G06F 3/1273* (2013.01); *G06F 3/1285* (2013.01); *H04N 2201/0015* (2013.01); *H04N 2201/0039* (2013.01); *H04N 2201/0094* (2013.01)

(58) Field of Classification Search
USPC ....... 358/1.1–3.29, 1.11–1.18; 707/648, 672; 714/100, 54
See application file for complete search history.

(56) References Cited

U.S. PATENT DOCUMENTS

| 8,643,868 | B2* | 2/2014 | Masao | H04N 1/32122 |
| | | | | 358/1.15 |
| 8,854,667 | B2* | 10/2014 | Ishii | G06F 3/1259 |
| | | | | 358/1.15 |
| 10,841,436 | B2* | 11/2020 | Hasegawa | H04N 1/00204 |
| 2010/0011225 | A1* | 1/2010 | Takayama | G06F 21/572 |
| | | | | 713/189 |
| 2014/0293335 | A1* | 10/2014 | Kikuchi | G06F 3/1286 |
| | | | | 358/1.15 |

(Continued)

*Primary Examiner* — Marcellus J Augustin
(74) *Attorney, Agent, or Firm* — Canon U.S.A., Inc. IP Division

(57) ABSTRACT

An image forming apparatus includes a communication unit configured to communicate with an external controller, a reception unit configured to receive, in a case where a predetermined error related to the communication occurs, log information on the predetermined error from the external controller, and a storage control unit configured to store, in a storage unit of the image forming apparatus, the log information received from the external controller and log information indicating an operation of the image forming apparatus corresponding to a timing at which the predetermined error has occurred.

8 Claims, 18 Drawing Sheets

(56) References Cited

U.S. PATENT DOCUMENTS

| | | | | |
|---|---|---|---|---|
| 2014/0376025 A1* | 12/2014 | Ito | ................... | H04N 1/00244 |
| | | | | 358/1.14 |
| 2015/0381827 A1* | 12/2015 | Kambegawa | ...... | H04N 1/32101 |
| | | | | 358/1.15 |
| 2016/0255245 A1* | 9/2016 | Ishibashi | ................ | H04W 8/22 |
| | | | | 358/1.14 |
| 2016/0328282 A1* | 11/2016 | Rogati | ................ | G06F 11/079 |
| 2019/0260903 A1* | 8/2019 | Morita | ................ | G06F 3/1203 |

\* cited by examiner

FIG. 3

| | LOG NAME | LOG DETAIL |
|---|---|---|
| EXTERNAL CONTROLLER | SYSTEM LOG | LOG OF OS START, SYSTEM CALL, AND HARDWARE DETECTION ETC. |
| EXTERNAL CONTROLLER | NETWORK LOG | LOG OF NETWORK DEVICE, CONFIGURATION INFORMATION, AND COMMAND TRANSMISSION/RECEPTION ETC. |
| EXTERNAL CONTROLLER | PRINT PROCESS LOG | LOG OF IMAGE DATA ANALYSIS AND INPUT OF PRINT COMMAND ETC. |
| IMAGE FORMING APPARATUS | SYSTEM LOG | LOG OF OS START, SYSTEM CALL, AND HARDWARE DETECTION ETC. |
| IMAGE FORMING APPARATUS | NETWORK LOG | LOG OF NETWORK DEVICE, CONFIGURATION INFORMATION, AND COMMAND TRANSMISSION/RECEPTION ETC. |
| IMAGE FORMING APPARATUS | PRINT PROCESS LOG | LOG OF RECEPTION OF PRINT COMMAND AND CONTROL ETC. |
| IMAGE FORMING APPARATUS | PRINT LOG | INFORMATION ON COMPLETED PRINT JOB ETC. |
| IMAGE FORMING APPARATUS | OPTIONAL DEVICE LOG | LOG OF CONTROL ON OPTIONAL DEVICE SUCH AS FINISHER ETC. |
| IMAGE FORMING APPARATUS | ERROR LOG | LOG OF ERROR OCCURRED IN IMAGE FORMING APPARATUS ETC. |
| IMAGE FORMING APPARATUS | IMAGE PROCESSING LOG | LOG OF ANALYSIS ON RECEIVED IMAGE DATA ETC. |

FIG. 4

| | DESCRIPTION |
|---|---|
| TEMPORARY LOG | LOG THAT IS CONSTANTLY ACQUIRED. OLDEST LOG IS DELETED WHEN PREDETERMINED UPPER LIMIT OF CAPACITY OR COUNT IS EXCEEDED |
| ARCHIVE LOG | LOG STORED IN RESPONSE TO STORAGE INSTRUCTION FROM USER OR THE LIKE. TEMPORARY LOG AT TIMING OF INSTRUCTION AND NEW LOG SUCH AS INFORMATION ON JOB NOT INCLUDED IN TEMPORARY LOG MAY BE STORED. STORED IN AREA IN HDD DIFFERENT FROM STORAGE AREA OF TEMPORARY LOG. OLDEST LOG IS DELETED WHEN PREDETERMINED UPPER LIMIT OF CAPACITY OR COUNT, SET INDEPENDENTLY FROM THAT OF TEMPORARY LOG, IS EXCEEDED. |

FIG. 7

| PRINT COMMAND | TIMEOUT TIME |
|---|---|
| AFTER RECEPTION OF SETTING ON ENTIRE JOB | 30 SECONDS |
| AFTER RECEPTION OF SETTING INFORMATION | 120 SECONDS |
| AFTER RECEPTION OF IMAGE DATA | 60 SECONDS |

FIG. 8

| PROBLEM | EXAMPLE OF CAUSE |
|---|---|
| SETTING INFORMATION NOT INPUT FROM EXTERNAL CONTROLLER | • PROBLEM IN INTERNAL LAN<br>• UNEXPECTED SYSTEM CALL ERROR<br>• UNEXPECTED NETWORK ERROR<br>• UNEXPECTED PRINT PROCESS ERROR |
| IMAGE DATA NOT INPUT FROM EXTERNAL CONTROLLER | • PROBLEM IN VIDEO CABLE<br>• FAULTY IMAGE DATA INPUT<br>• UNEXPECTED SYSTEM CALL ERROR<br>• UNEXPECTED NETWORK ERROR<br>• UNEXPECTED PRINT PROCESS ERROR |
| JOB TRANSFER COMPLETION NOTIFICATION NOT INPUT FROM EXTERNAL CONTROLLER | • PROBLEM IN INTERNAL LAN<br>• UNEXPECTED SYSTEM CALL ERROR<br>• UNEXPECTED NETWORK ERROR<br>• UNEXPECTED PRINT PROCESS ERROR |

FIG. 10

| PRINT COMMAND | TIMEOUT TIME |
|---|---|
| AFTER INPUT OF SETTING ON ENTIRE JOB | 30 SECONDS |
| AFTER INPUT OF SETTING INFORMATION | 120 SECONDS |
| AFTER INPUT OF IMAGE DATA | 60 SECONDS |

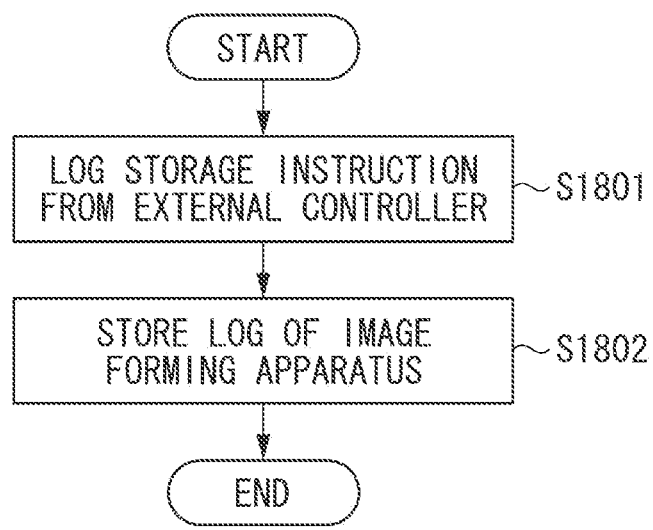

IMAGE FORMING APPARATUS, INFORMATION PROCESSING APPARATUS, METHOD OF CONTROLLING IMAGE FORMING APPARATUS, METHOD OF CONTROLLING INFORMATION PROCESSING APPARATUS, AND STORAGE MEDIUM

CROSS-REFERENCE TO RELATED APPLICATIONS

This application is a Continuation of U.S. patent application Ser. No. 15/614,188, filed Jun. 5, 2017, which claims the benefit of Japanese Patent Application No. 2016-113723, filed Jun. 7, 2016, both of which are hereby incorporated by reference herein in their entirety.

BACKGROUND OF THE INVENTION

Field of the Invention

The present invention relates to an image forming apparatus that stores a log of the image forming apparatus and a log of an external controller at a time of an occurrence of an error, an information processing apparatus, methods of controlling these apparatuses, and a recording medium.

Description of the Related Art

It has been a common practice to store a log when an operation error occurs in a printing apparatus, to analyze a cause of the error. For example, the log includes information on a user operation, a print job execution status, and a program execution status.

In one conventionally known printing system, an external image processing controller (hereinafter, referred to as an external controller) known as a digital front end is connected to a printing apparatus. The external controller thus connected enables to add functions that cannot be achieved by the printing apparatus alone and to achieve print processing with a higher quality and a higher speed. For example, the external controller executes raster image processor (RIP) processing on print data received from a personal computer (PC) or the like, and then outputs the processed print data to the printing apparatus.

Japanese Patent Application Laid-Open No. 2016-45702 discusses a system in which a log of a printing apparatus and a log of an external controller are each collected, so that an error investigation can be performed in the printing system. In the system discussed in Japanese Patent Application Laid-Open No. 2016-45702, logs of the printing apparatus and of the external controller are collectively managed by the external controller with the log of the printing apparatus transmitted to the external controller.

In the system discussed in Japanese Patent Application Laid-Open No. 2016-45702, the printing apparatus and the external controller are each programmed in such a manner that when predetermined processing is executed, a log indicating the execution of the processing is generated and stored in a hard disk together with a timestamp.

SUMMARY OF THE INVENTION

Embodiments of the present invention include the following image forming apparatus.

An image forming apparatus includes a memory device that stores a set of instructions and at least one processor being operable when executing the instructions to perform communication with an external controller, receive, in a case where a predetermined error related to the communication occurs, log information on the predetermined error from the external controller, and store, in a storage unit of the image forming apparatus, the log information received from the external controller and log information indicating an operation of the image forming apparatus corresponding to a timing at which the predetermined error has occurred.

Embodiments of the present invention include the following information processing apparatus.

An information processing apparatus includes a memory device that stores a set of instructions, and at least one processor being operable when executing the instructions to perform communication with an image forming apparatus, and transmit, in a case where a predetermined error related to the communication occurs, log information on the predetermined error to the image forming apparatus. The log information transmitted to the image forming apparatus is stored in the image forming apparatus together with log information indicating an operation of the image forming apparatus corresponding to a timing at which the predetermined error has occurred.

Further features of the present invention will become apparent from the following description of exemplary embodiments with reference to the attached drawings.

BRIEF DESCRIPTION OF THE DRAWINGS

FIG. 3 is a diagram illustrating examples of logs.

FIG. 4 is a diagram illustrating a difference between a temporary log and an archive log in operations.

FIG. 7 is a diagram illustrating examples of time-out periods based on which an image forming apparatus determines an error.

FIG. 8 is a diagram illustrating examples of causes of problems hindering transmission of a print command for a long time period.

FIG. 10 is a diagram illustrating examples of time-out periods based on which an external controller determines an error.

FIG. 18 is a flowchart illustrating an example of information processing executed by the image forming apparatus upon receiving a log storage instruction.

DESCRIPTION OF THE EMBODIMENTS

Exemplary embodiments of the present invention are described below with reference to the drawings.
(Image Processing System)

Figure 1:
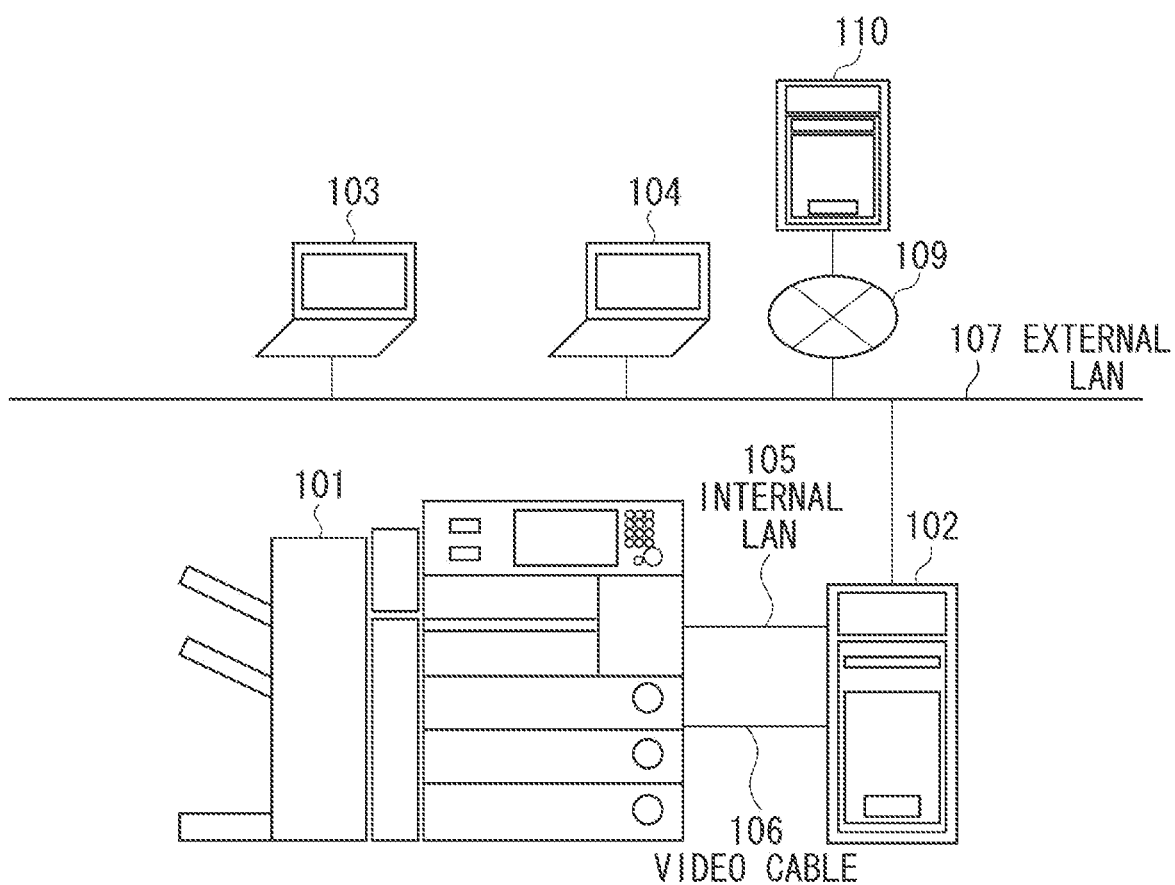
FIG. 1 is a diagram illustrating an example of a system configuration of an image processing system.

FIG. 1 is a diagram illustrating an example of a system configuration of an image processing system. The image processing system includes an image forming apparatus 101 and an external controller 102. The image forming apparatus 101 and the external controller 102 are communicably connected to each other through an internal local area network (LAN) 105 and a video cable 106.

The external controller 102 is communicably connected with a client personal computer (PC), such as a PC 103 and a PC 104, through an external LAN 107. The PC 103 and the PC 104 issue a print instruction to the image forming apparatus 101 via the external controller 102. More specifically, upon receiving the print instruction from the PC 103 or the PC 104, the external controller 102 executes image processing and raster image processor (RIP) processing, and inputs the processed image data and issues a print instruction to the image forming apparatus 101. The external controller 102 can acquire a status of a print job being executed, in response to a request from the PC 103 or the PC 104.

The image forming apparatus 101 is not directly connected with the external LAN 107, and communicates with the PC 103 and the PC 104 via the external controller 102. Upon receiving communication data issued to the image forming apparatus 101 through the external LAN 107, the external controller 102 transfers the communication data to the image forming apparatus 101 through the internal LAN 105. Upon receiving communication data destined to an external client (i.e., PC 103 or the PC 104) through the internal LAN 105, the external controller 102 transfers the communication data to the external client through the external LAN 107. In the system illustrated in FIG. 1, the image forming apparatus 101 is connected with a management server 110 through a network 109. The network 109 is a wide area network such as the Internet for example. The management server 110 receives and stores log information on an operation of the image forming apparatus 101 and log information on an operation of the external controller 102. In the present exemplary embodiment, the management server 110 receives the log information on the operation of the image forming apparatus 101 and the log information on the operation of the external controller 102 from the image forming apparatus 101. The management server 110 can collect the log information from a plurality of the image forming apparatuses 101.
(Hardware Configurations of Image Forming Apparatus and External Controller)

Figure 2:
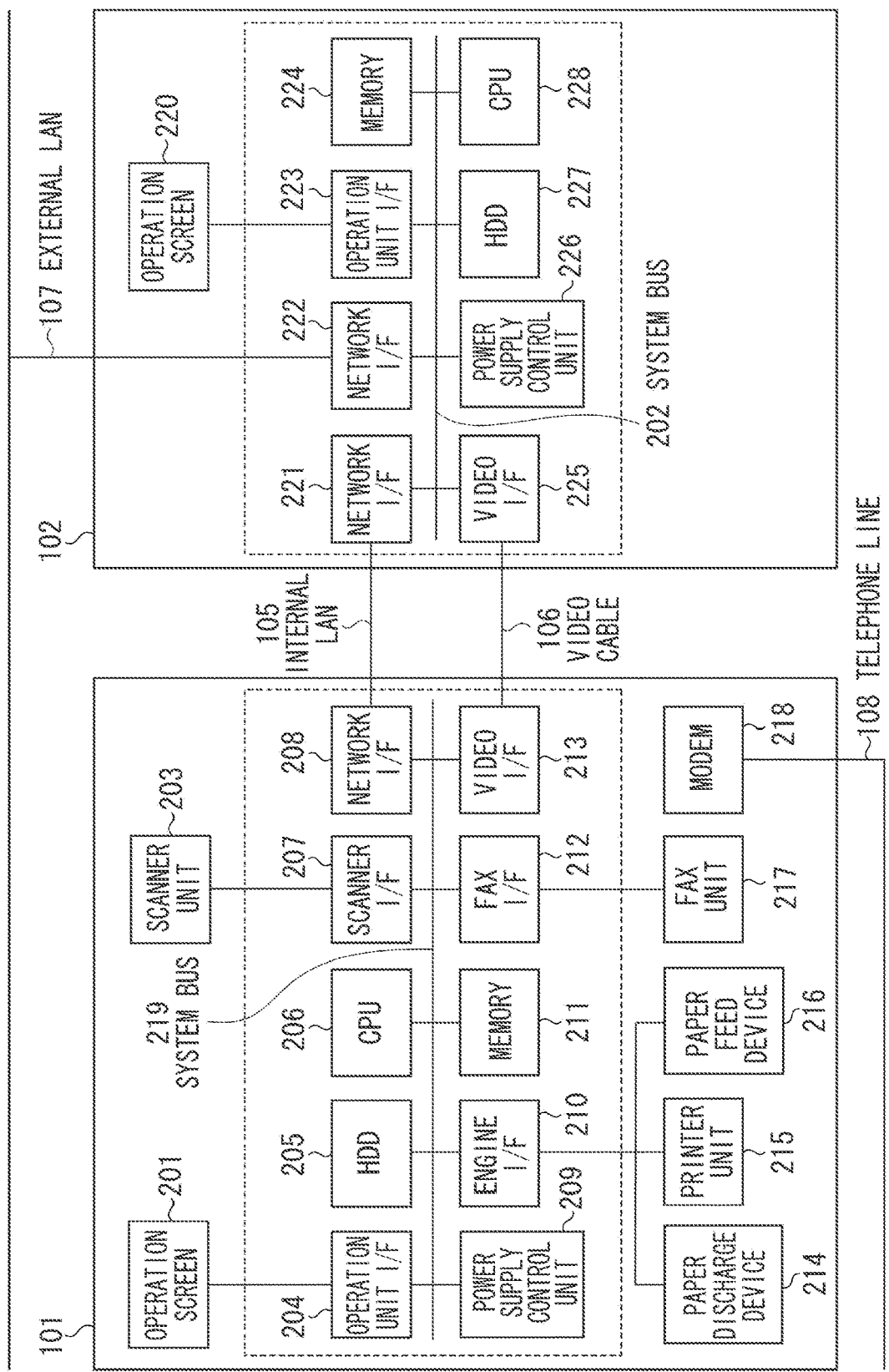
FIG. 2 is a diagram illustrating an example of hardware configurations.

FIG. 2 is a diagram illustrating an example of hardware configurations of the image forming apparatus 101 and the external controller 102.

The image forming apparatus 101 includes an operation unit interface (I/F) 204, a hard disk drive (HDD) 205, a central processing unit (CPU) 206, a scanner I/F 207, a network I/F 208, a power supply control unit 209, an engine I/F 210, a memory 211, a fax I/F 212, and a video I/F 213.

The operation unit I/F 204 is connected with an operation screen 201. The operation screen 201 includes an operation button and a display panel. The operation button of the operation screen 201 receives an input from a user. The display panel of the operation screen 201 displays information such as a printing status. The HDD 205 is a storage device. The CPU 206 performs control of the components of the image forming apparatus 101, calculations, and the like via a system bus 219. The scanner 203, connected via the scanner I/F 207, reads an original and inputs image data. The network I/F 208 is connected to the external controller 102 through the internal LAN 105. Communications such as issuing a print job instruction are performed through the network I/F 208. The power supply control unit 209 controls power supply to the components of the image forming apparatus 101. A paper feed device 216, a printer unit 215, and a paper discharge device 214 are connected to each other through the engine I/F 210. The paper feed device 216 feeds a supplied sheet to the printer unit 215. The printer unit 215 prints an image on the received sheet. The paper discharge device 214 receives the sheet printed by the printer unit 215, and executes post processing including discharging, sorting, stapling, punching, and cutting on the received sheet. The memory 211 is used as a work memory by the CPU 206. A fax unit 217 is connected via the fax I/F 212. The fax unit 217 is connected to a telephone line 108 via a modem 218, and is used for transmitting/receiving fax data. The video I/F 213 is connected to the external controller 102 via the video cable 106 and is used for inputting image data. When the CPU 206 executes processing based on a program stored in the memory 211 or the HDD 205, functions of the image forming apparatus 101, processing of the image forming apparatus 101 illustrated in sequence diagrams in FIG. 5 and FIG. 14 described below, processing illustrated in flowcharts in FIG. 12, FIG. 16, and FIG. 18 described below are implemented.

The external controller 102 includes a network I/F 221, a network I/F 222, an operation unit I/F 223, a memory 224, a video I/F 225, a power supply control unit 226, an HDD 227, and a CPU 228, connected to each other via a system bus 202. The network I/F 221 is connected with the image forming apparatus 101 via the internal LAN 105. Communications including issuing a print job instruction are performed via the network I/F 221. The network I/F 222 is connected with the external LAN 107. Communications such as issuing a print instruction from a client PC are performed through the network I/F 222. The operation unit I/F 223 is connected with an operation screen 220. The operation screen 220 includes an operation button and a display panel. The operation button of the operation screen 220 receives an input from a user. The display panel of the operation screen 220 displays information such as a printing status. The memory 224 is used as a work memory by the CPU 228. The video I/F 225 is connected to the image forming apparatus 101 via the video cable 106 and is used for inputting image data and issuing notification indicating a power supply status. The power supply control unit 226 controls power supply to the components of the external controller 102. The HDD 227 is a large capacity storage device. The CPU 228 performs control of the components of the external controller 102, calculations, and the like via the system bus 202. When the CPU 228 executes processing based on a program stored in the memory 224 or the HDD 227, functions of the external controller 102, processing of the external controller 102 illustrated in the sequence diagrams in FIG. 5 and FIG. 14 described below, and processing illustrated in the flowcharts in FIG. 9, FIG. 13, FIG. 15, and FIG. 17 described below are implemented.

FIG. 3 is a diagram illustrating examples of logs stored in the image forming apparatus 101 and the external controller 102. Logs including a system log, a network log, and a print process log are stored in the HDD 227 of the external controller 102. The system log of the external controller 102 includes histories of starting of an operating system (OS), a system call, hardware detection, and the like. The network log of the external controller 102 includes network device information, configuration information, and a history of transmission/reception of a command. The print process log of the external controller 102 includes histories of image data analysis and input of a print command.

A system log, a network log, a print process log, a print log, an optional device log, an error log, an image processing log, and the like are stored in the HDD 205 of the image forming apparatus 101. The system log of the image forming apparatus 101 includes histories of starting of an OS, a system call, hardware detection, and the like. The network log of the image forming apparatus 101 includes network device information, configuration information, and a history of transmission/reception of a command. The print process log of the image forming apparatus 101 includes a history of reception of a print command and a control history. The print log of the image forming apparatus 101 includes information on a completed print job. The optional device log of the image forming apparatus 101 includes a control history of an optional device such as a finisher. The error log of the image forming apparatus 101 includes a history of an error generated in the image forming apparatus 101. The image processing log of the image forming apparatus 101 includes a log of analysis on the received image data. A cause of an error having occurred in the image forming apparatus 101 and the external controller 102 can be analyzed based on an analysis of the above-described logs.

FIG. 4 is a diagram illustrating a difference between a temporary log and an archive log in operations in the image forming apparatus 101 and the external controller 102. Print processing involves a large variety of control processing for the image forming apparatus 101 and the external controller 102 and thus involves a large number of logs. Thus, storing all the logs would consume the capacities of the HDD 205 and the HDD 227, and thus is not be a realistic solution. Thus, as illustrated in FIG. 4, the logs are stored in the image forming apparatus 101 and the external controller 102 while being classified into two types. More specifically, the logs are stored as a temporary log or an archive log.

The temporary log is a log constantly acquired in the image forming apparatus 101 and the external controller 102. When the stored temporary logs exceed a predetermined upper limit capacity or count, the oldest log is deleted. Thus, if a temporary log is acquired, a temporary log stored at a time when an error has occurred may be deleted when a time period has elapsed after the occurrence of the error.

The archive log is a log stored in response to a log storage instruction from a user. The archive log includes a temporary log at the time when the instruction is given, and may also include a log not included in the temporary log such as information on a currently executed job for example. The archive log is stored in an area in the HDD different from a storage area for the temporary log. When the stored archive logs exceed an upper limit capacity or count, set independently from that of the temporary log, the oldest log is deleted. The archive log is stored not only when a storage instruction is issued from a user but also when an error is detected. The archive log is stored in an area in the HDD different from the storage area for the temporary log, so that a log at the time when the storage instruction is given can be reliably stored.

Figure 5:
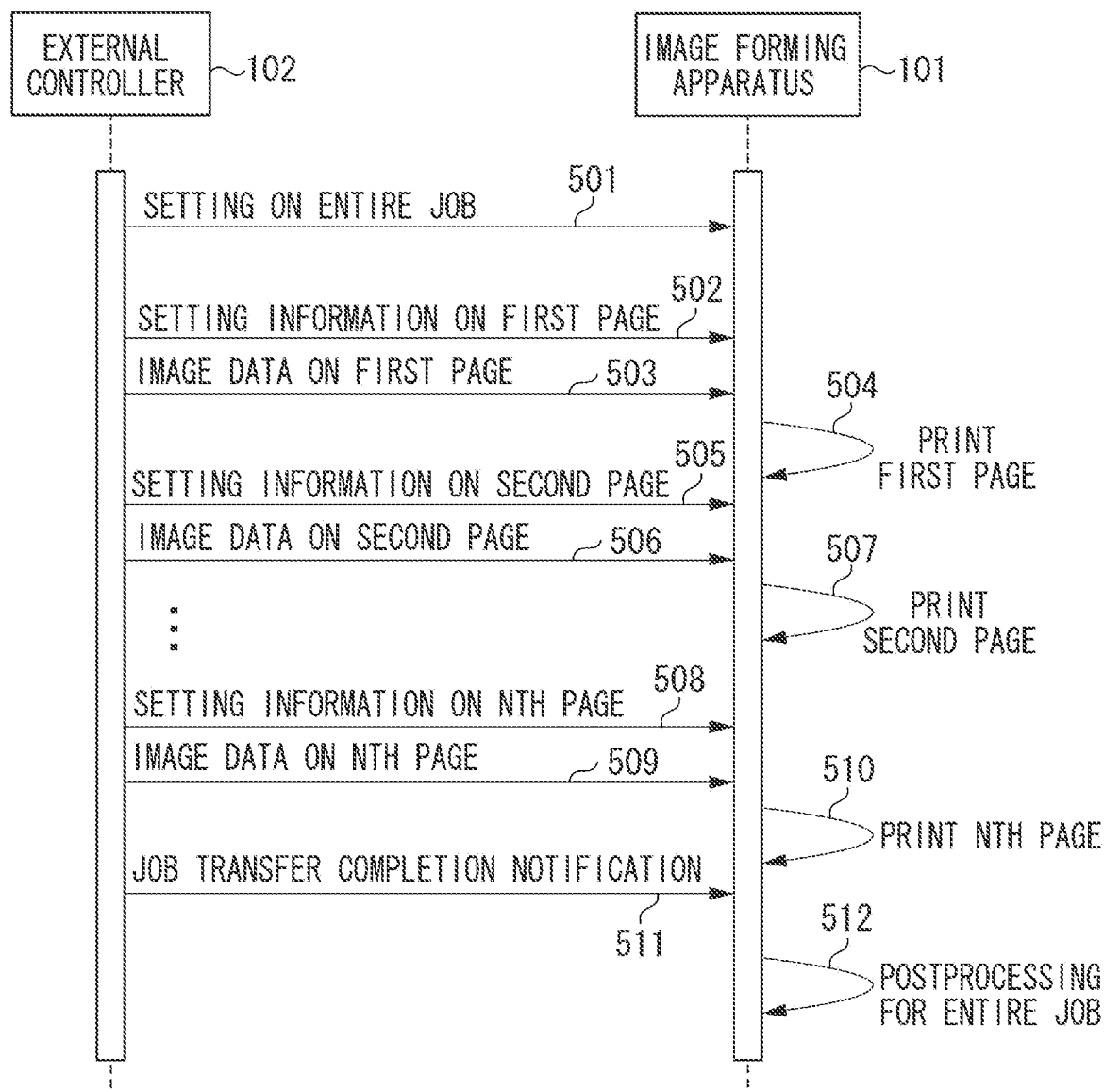
FIG. 5 is a sequence diagram illustrating a flow of commands transmitted when a print job is input.

FIG. 5 is a sequence diagram illustrating a flow of commands transmitted when the external controller 102 inputs a print job to the image forming apparatus 101. These commands are transmitted through the internal LAN 105 or the video cable 106. Processing of the external controller 102 illustrated in FIG. 5 is related to processing performed when transmission of a print job is being executed. Processing of the image forming apparatus 101 illustrated in FIG. 5 is related to processing performed when reception of the print job is being executed. Upon receiving a print job from an external client such as the PC 103 or the PC 104, the external controller 102 transmits print commands illustrated in FIG. 5. First of all, the external controller 102 transmits an entire print job setting 501 to the image forming apparatus 101. For example, the entire print job setting 501 includes a name of the print job and a setting of post processing in the print job such as stapling and punching. Then, the external controller 102 sequentially transmits print data of each page included the print job to the image forming apparatus 101 one by one starting from the first page. The print data includes setting information and image data. When a print job including N pages is input, the external controller 102 sequentially transmits print data starting from setting information 502 and image data 503 on the first page to setting information 508 and image data 509 on the Nth page. The setting information includes settings such as a density and a print position of the image on each page. Upon receiving the setting information and the image data, the image forming apparatus 101 starts print processing on the image data of the received page. Upon receiving the setting information 502 and the image data 503 on the first page, the image forming apparatus 101 starts print processing for the first page in step 504. Upon receiving the setting information 508 and the image data 509 on the Nth page after sequentially receiving print data of the previous pages, the image forming apparatus 101 starts print processing for the Nth page in step 510. When the transmission of the print data of N pages is completed, the external controller 102 transmits a job transfer completion notification 511 to the image forming apparatus 101. Upon receiving the job transfer completion notification 511, the image forming apparatus 101 executes post processing for the entire print job in step 512. The post processing for the entire print job includes stapling processing on all the pages.

Figure 6:
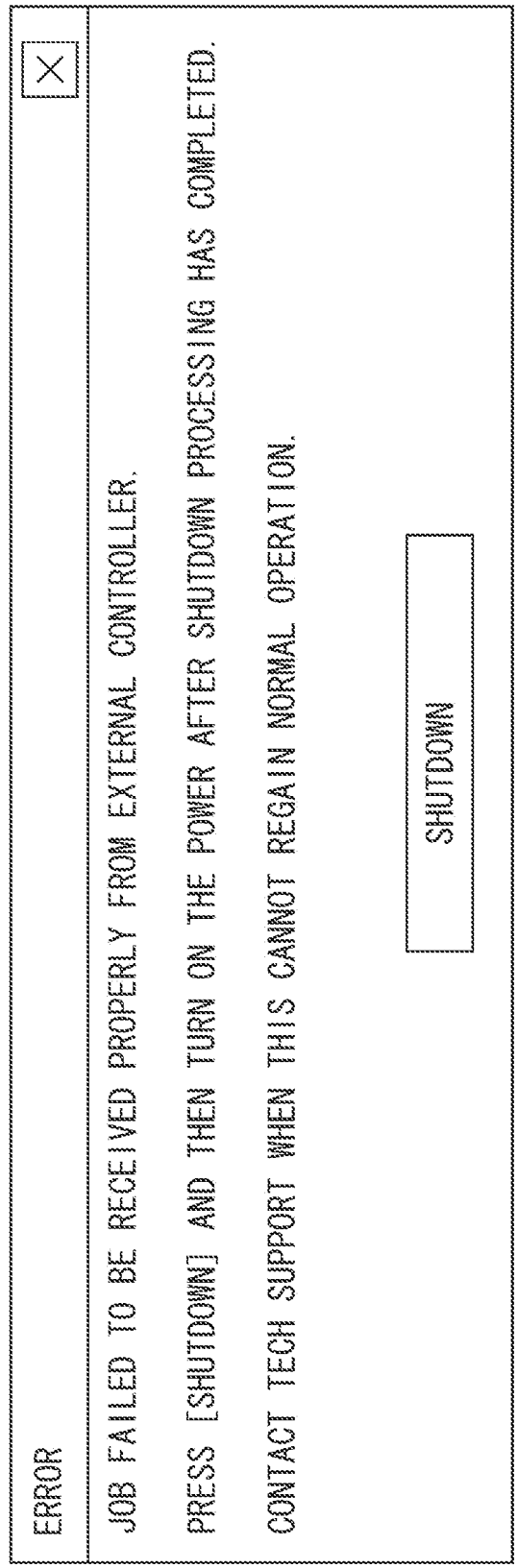
FIG. 6 is a diagram illustrating an example of an error screen displayed on an operation screen.

FIG. 6 is a diagram illustrating an example of an error screen displayed on the operation screen 201 in a case where the image forming apparatus 101 fails to properly complete reception of the print command from the external controller 102. The case where the reception of the print command from the external controller 102 fails to be properly completed includes a case where the image forming apparatus 101 fails to properly complete the reception of each print command illustrated in FIG. 5 within a predetermined time period. There are several reasons as to why the image forming apparatus 101 determines an occurrence of a timeout based on the predetermined time period and displays the error screen. When the image forming apparatus 101 keeps waiting for the print command from the external controller 102, the print processing is not executed for a long time period and this delay may not be immediately noticeable to the user. Furthermore, while the reception of a print job from the external controller 102 is in process, reception of a print job from another client such as a PC by the image forming apparatus 101 is limited. For these reasons, the image forming apparatus 101 determines whether a timeout has occurred based on the predetermined time period having elapsed and displays the error screen.

FIG. 7 is a diagram illustrating examples of time-out periods based on which the image forming apparatus 101 determines an error. In a case where no print command is received within the time-out period illustrated in FIG. 7 during a period between the reception of the entire print job setting 501 from the external controller 102 and the reception of the job transfer completion notification 511, the image forming apparatus 101 determines that the timeout has occurred. The CPU 206 of the image forming apparatus 101 determines whether a timeout has occurred by monitoring the network I/F 208 or the video I/F 213 to check whether the print command has been received. A time period expected to take for transmission/reception of a print command varies depending on aspects such as processing executed by the external controller 102 to transmit the print command and a data amount of the print command, and thus the time-out period varies among print commands. The image forming apparatus 101 receives the setting information 502 on the first page from the external controller 102, after receiving the entire print job setting 501. A time-out period after the image forming apparatus 101 has received the entire print job setting 501 is set to 30 seconds. The image forming apparatus 101 receives the image data from the external controller 102 after receiving the setting information. A time-out period after the image forming apparatus 101 has received the setting information 502, 505, or 508 is set to 120 seconds. The image forming apparatus 101 receives setting information on the next page or the job transfer completion notification from the external controller 102, after receiving the image data. A time-out period after the image forming apparatus 101 has received the image data 503, 506, or 509 is set to 60 seconds.

FIG. 8 is a diagram illustrating examples of causes of problems hindering the transmission of a print command from the external controller 102 for a long time period. A cause of a problem that the setting information 502, 505, or 508 cannot be input includes an error in the internal LAN 105, reception of unknown setting information, and an unexpected system call error, network error, or print process error of the external controller 102. A cause of a problem that the image data 503, 506, or 509 cannot be input includes an error in the video cable 106, reception of unknown image data, and an unexpected system call error, network error, or print process error of the external controller 102. A cause of a problem that the job transfer completion notification 511 cannot be input includes an error in the internal LAN 105, and an unexpected system call error, network error, or print process error of the external controller 102. In many cases, identification of the causes cannot be achieved only with a log stored in the image forming apparatus 101 and requires a log stored in the external controller 102.

Figure 9:
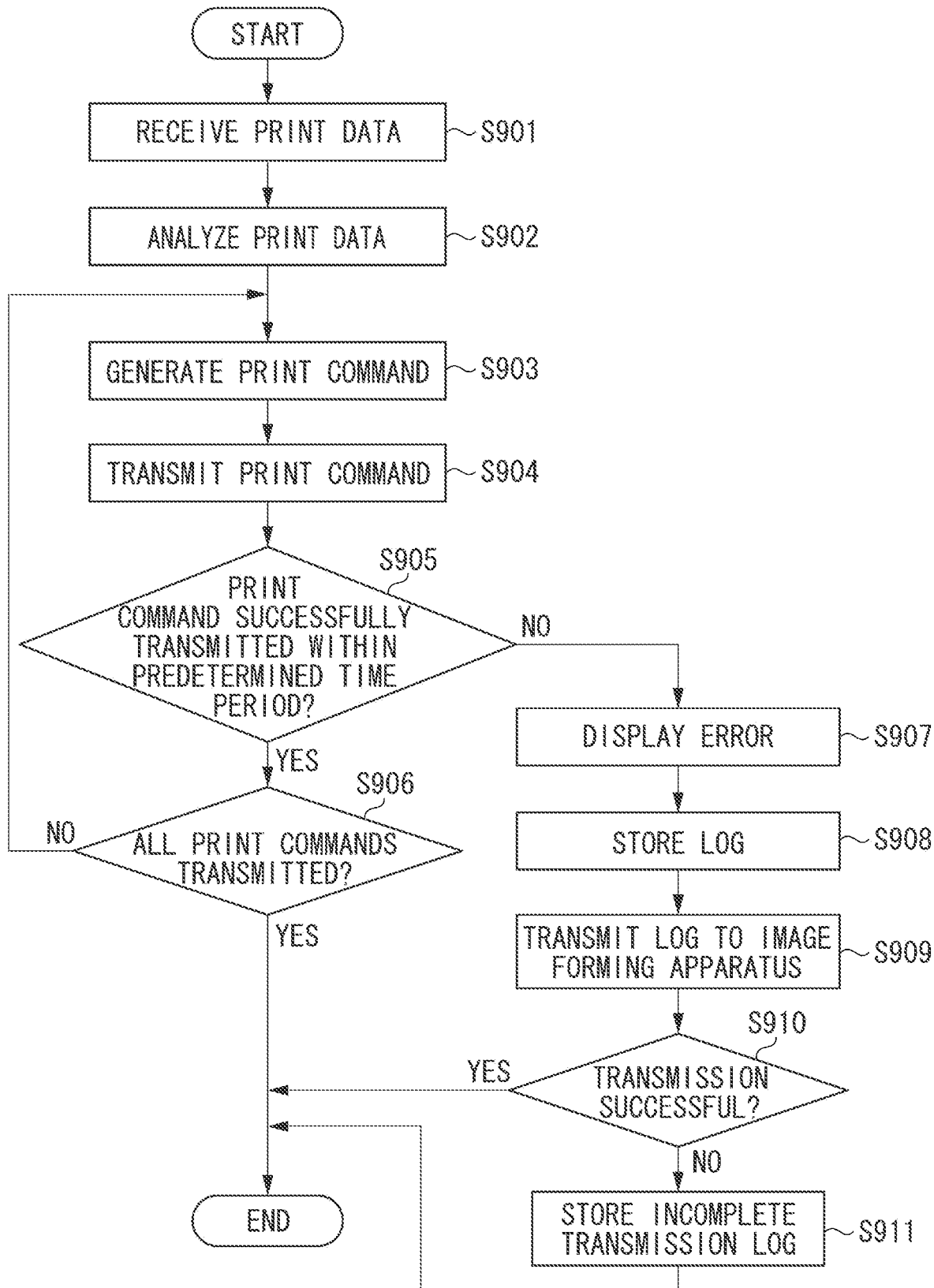
FIG. 9 is a flowchart illustrating an example of information processing executed when a print job is input.

A first exemplary embodiment is described below. FIG. 9 is a flowchart illustrating an example of image processing executed by the external controller 102 to input a print job to the image forming apparatus 101.

In step S901, the CPU 228 receives print data from the PC 103 or the PC 104.

In step S902, the CPU 228 analyzes the print data. The analysis on the print data is referred to as raster image processor (RIP). The CPU 228 executes processing for converting print data in a format such as PostScript (PS) and Portable Document Format (PDF) into data in a format that can be analyzed by the image forming apparatus 101.

In step S903, the CPU 228 generates a print command. The print command includes the entire print job setting 501 and setting information 502, 505, and 508 on the pages described with reference to FIG. 5.

In step S904, the CPU 228 transmits the print command generated in step S903 to the image forming apparatus 101.

In step S905, the CPU 228 determines whether the print command transmitted in step S904 has been successfully transmitted within a predetermined time period. The predetermined time period in step S905 differs among print commands. FIG. 10 is a diagram illustrating examples of the time-out periods based on which the external controller 102 determines an error. The time-out periods correspond to and are the same as the time-out periods illustrated in FIG. 7 based on which the image forming apparatus 101 determines an error. The external controller 102 determines that the timeout has occurred when a command fails to be transmitted within a predetermined time period. The CPU 228 of the external controller 102 determines whether the timeout has occurred by monitoring the network I/F 221 or the video I/F 225 to check whether the print command has been transmitted. When the CPU 228 determines that the print command has been successfully transmitted within a predetermined time period (YES in step S905), the processing proceeds to step S906. On the other hand, when the CPU 228 determines that the print command has failed to be transmitted within the predetermined time period (NO in step S905), the processing proceeds to step S907.

In step S906, the CPU 228 determines whether the transmission of all the print commands has been completed. When the CPU 228 determines that the transmission of all the print commands has been completed (YES in step S906), the job transmission processing illustrated in FIG. 9 is terminated. When the CPU 228 determines that the transmission of all the print commands has not been completed (NO in step S906), the processing returns to step S903, and a next print command is generated.

Figure 11:
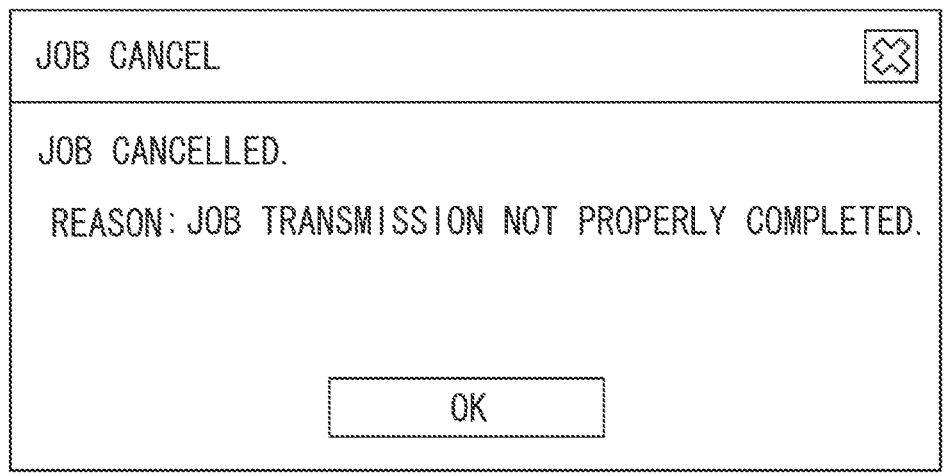
FIG. 11 is a diagram illustrating an example of an error screen displayed on the operation screen.

In step S907, the CPU 228 displays an error screen on the operation screen 220. FIG. 11 is a diagram illustrating an example of the error screen displayed on the operation screen 220. The error screen is used for notifying the user of that the job transmission has not been properly completed.

In step S908, the CPU 228 stores a log of the external controller 102 in the HDD 227. The log of the external controller 102 stored in step S908 is the archive log illustrated in FIG. 4. Thus, a temporary log at this timing or a new log such as information on a job or the like not included in the temporary log is stored.

In step S909, the CPU 228 transmits the log stored in step S908 to the image forming apparatus 101. Thus, when a predetermined error related to communication between the external controller 102 and the image forming apparatus 101 occurs, the image forming apparatus 101 receives log information on the predetermined error from the external controller 102.

In step S910, the CPU 228 determines whether the log transmission in step S909 has been successfully completed. When the CPU 228 determines that the log transmission has been successfully completed (YES in step S910), the job transmission processing illustrated in FIG. 9 is terminated. On the other hand, when the CPU 228 determines that the log transmission has failed (NO in step S910), the processing proceeds to step S911. A cause of this transmission failure includes an error in a network communication.

In step S911, the CPU 228 stores an incompletely transmitted log, as the log failed to be transmitted, in the HDD 227, and the job transmission processing illustrated in FIG.

9 is terminated. The CPU 228 transmits the log stored in the HDD 227 in step S911 to the image forming apparatus 101 the next time the connection is established with the image forming apparatus 101. Thus, when a predetermined error related to communication between the external controller 102 and the image forming apparatus 101 occurs, the image forming apparatus 101 receives log information on the predetermined error from the external controller 102.

Figure 12:
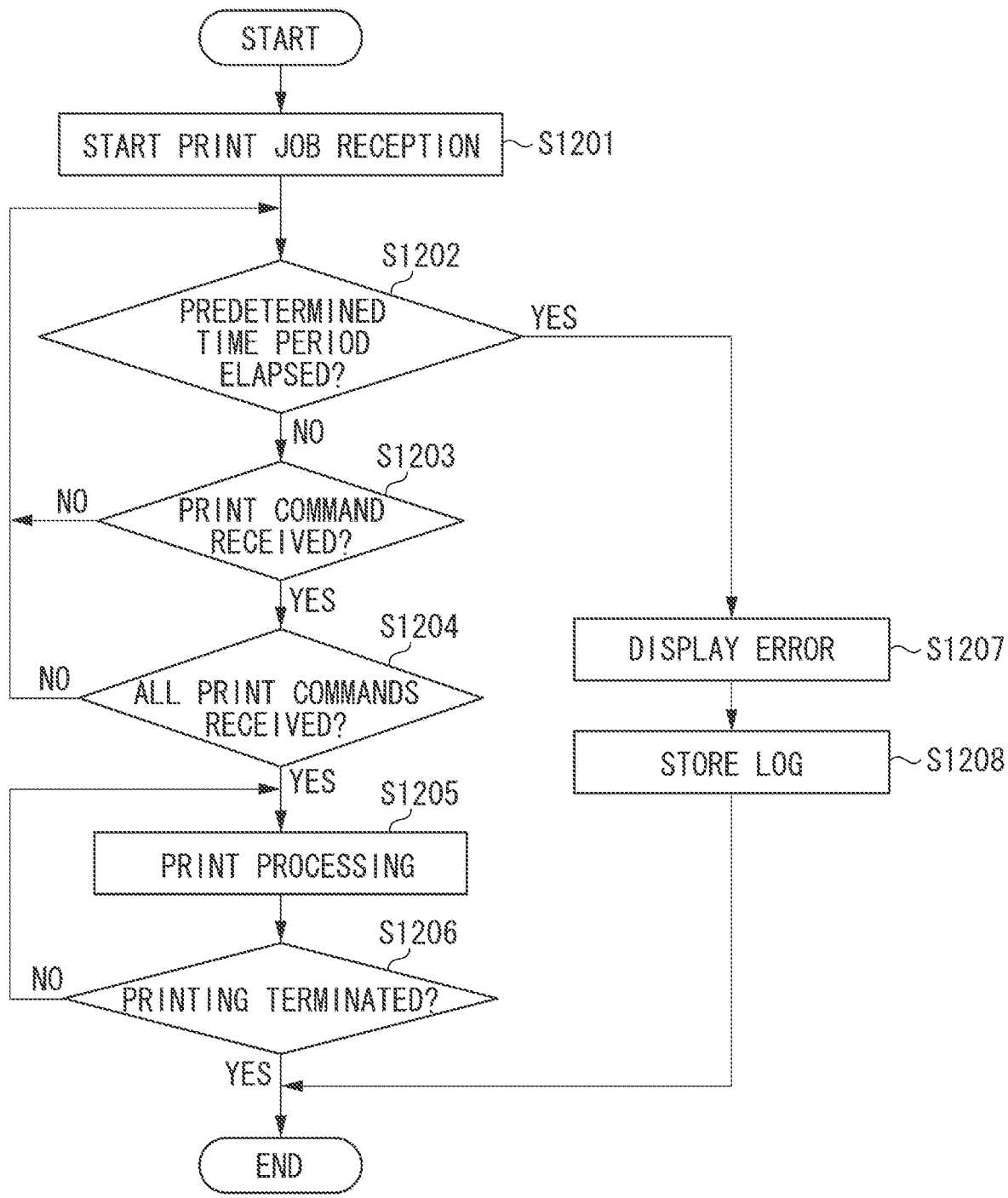
FIG. 12 is a flowchart illustrating an example of information processing executed when a print job is received.

FIG. 12 is a flowchart illustrating an example of information processing executed by the image forming apparatus 101 when a print job is received from the external controller 102.

In step S1201, the CPU 206 starts receiving a print job by receiving the entire print job setting 501 from the external controller 102. The image forming apparatus 101 is capable of receiving the print job in a standby state after powered on.

In step S1202, the CPU 206 determines whether a predetermined time period has elapsed after the reception of the previous command. The predetermined time period differs among the print commands in step S1202. The examples of the time-out periods based on which the image forming apparatus 101 determines an occurrence of an error are illustrated in FIG. 7. The time-out periods correspond to and are the same as the time-out periods illustrated in FIG. 10 based on which the external controller 102 determines an occurrence of an error. The CPU 206 determines that the timeout has occurred when no command has been received within the predetermined time period. When the CPU 206 determines that the predetermined time period has elapsed (YES in step S1202), the processing proceeds to step S1207. On the other hand, when the CPU 206 determines that the predetermined time period has not elapsed yet (NO in step S1202), the processing proceeds to step S1203.

In step S1203, the CPU 206 determines whether the print command has been received. The CPU 206 determines whether the predetermined time period has elapsed in step S1202 and determines whether the print command has been received in step S1203 by monitoring the network I/F 208 or the video I/F 213 to check whether the print command has been received. When the CPU 206 determines that the print command has not been received (NO in step S1203), the processing returns to step S1202. On the other hand, when the CPU 206 determines that the print command has been received (YES in step S1203), the processing proceeds to step S1204.

In step S1204, the CPU 206 determines whether all the print commands have been received. When the CPU 206 determines that all the print commands have been received (YES in step S1204), the processing proceeds to step S1205. On the other hand, when the CPU 206 determines that all the print commands have not been received (NO in step S1204), the processing returns to step S1202. The CPU 206 determines that all print commands have been received when the job transfer completion notification 511 illustrated in FIG. 5 has been received.

In step S1205, the CPU 206 starts print processing corresponding to the received print command.

In step S1206, the CPU 206 determines whether the print processing has been completed. When the CPU 206 determines that the processing has not been completed (NO in step S1206), the processing returns to step S1205. On the other hand, when the CPU 206 determines that the processing has been completed (YES in step S1206), the print job reception processing illustrated in FIG. 12 is terminated.

In step S1207, the CPU 206 displays the error screen as illustrated in FIG. 6 on the operation screen 201. The error screen notifies the user of that rebooting the image forming apparatus 101 is required because the job reception has not been properly completed.

In step S1208, the CPU 206 stores the log in the HDD 205, and the print job reception processing illustrated in FIG. 12 is terminated. The log of the image forming apparatus 101 stored in step S1208 is the archive log illustrated in FIG. 4. Thus, a temporary log at this timing or a new log such as information on a job or the like not included in the temporary log is stored.

Figure 13:
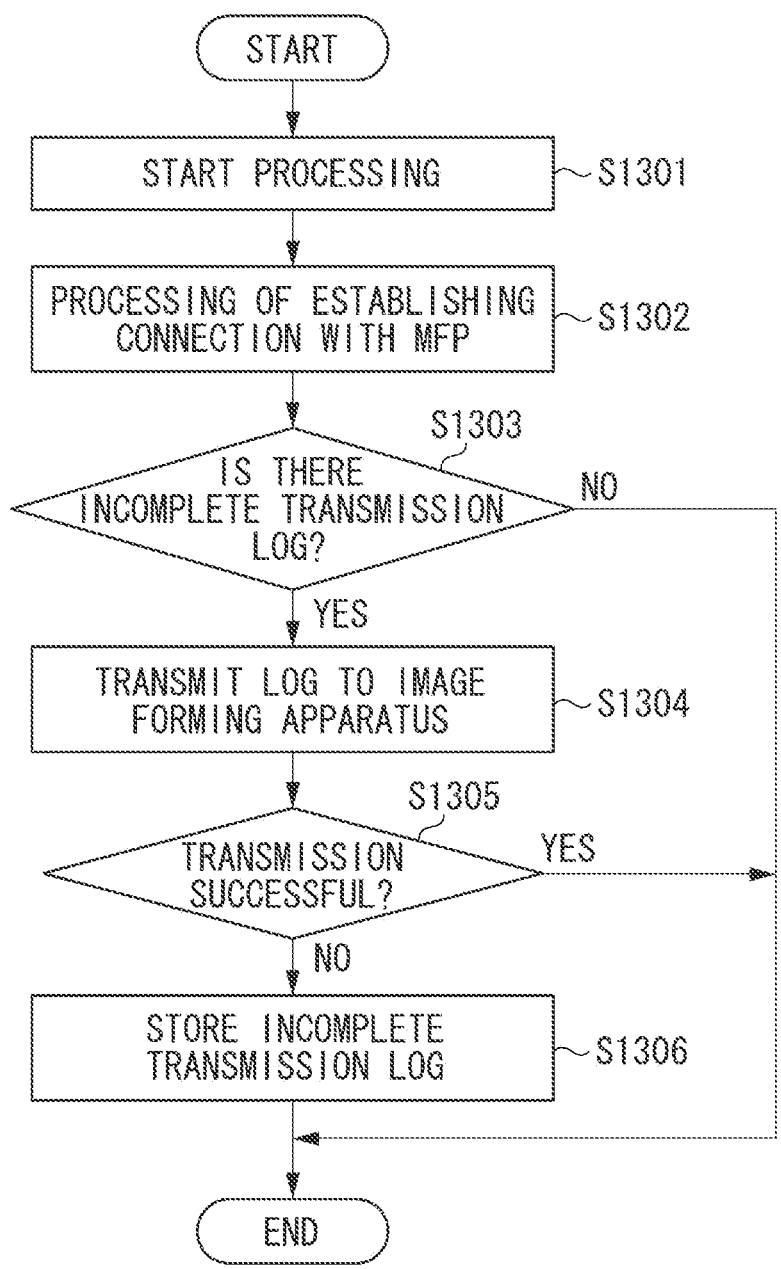
FIG. 13 is a flowchart illustrating an example of processing for starting the external controller.

FIG. 13 is a flowchart illustrating an example of processing for starting the external controller 102.

The start processing illustrated in FIG. 13 includes retransmission processing of the log that has failed to be transmitted from the external controller 102 to the image forming apparatus 101 in step S910 in FIG. 9.

In step S1301, the CPU 228 starts the start processing. The star processing in step S1301 includes processing for detecting hardware such as a mouse and starting various applications, as in normal start processing for a PC.

In step S1302, the CPU 228 starts processing for establishing a connection with the image forming apparatus 101. The connection processing in step S1302 includes acquiring configuration information on the image forming apparatus 101 by the external controller 102.

In step S1303, the CPU 228 determines whether an incomplete transmission log is stored in the HDD 227. The incomplete transmission log is a log failed to be transmitted and stored in step S911 in FIG. 9. When the CPU 228 determines that there is no incomplete transmission log (NO in step S1303), the processing of starting the external controller 102 illustrated in FIG. 13 is terminated. On the other hand, when the CPU 228 determines that there is the incomplete transmission log (YES in step S1303), the processing proceeds to step S1304.

In step S1304, the CPU 228 transmits the incomplete transmission log to the image forming apparatus 101. Thus, when a predetermined error related to communication between the external controller 102 and the image forming apparatus 101 occurs, the image forming apparatus 101 receives log information on the predetermined error from the external controller 102.

In step S1305, the CPU 228 determines whether the log transmission in step S1304 has been successfully completed. When the CPU 228 determines that the log transmission has been successfully completed (YES in step S1305), the processing for starting the external controller 102 in FIG. 13 is terminated. On the other hand, when the log transmission has failed (NO in step S1305), the processing proceeds to step S1306.

In step S1306, the CPU 228 stores the incomplete transmission log in the HDD 227, and the processing for starting the external controller 102 illustrated in FIG. 13 is terminated. The CPU 228 transmits the log stored in the HDD 227 in step S1306 to the image forming apparatus 101 the next time the connection is established with the image forming apparatus 101. The logs of the external controller 102 transmitted to the image forming apparatus 101 in step S909 in FIG. 9 and in step S1304 in FIG. 13 are stored in the image forming apparatus 101 together with the log of the image forming apparatus 101. The log stored in the image forming apparatus 101 can be acquired when a universal serial bus (USB) memory is connected to the image forming apparatus 101. The log stored in the image forming apparatus 101 can be also acquired from an external PC through a dedicated external application.

Figure 14:
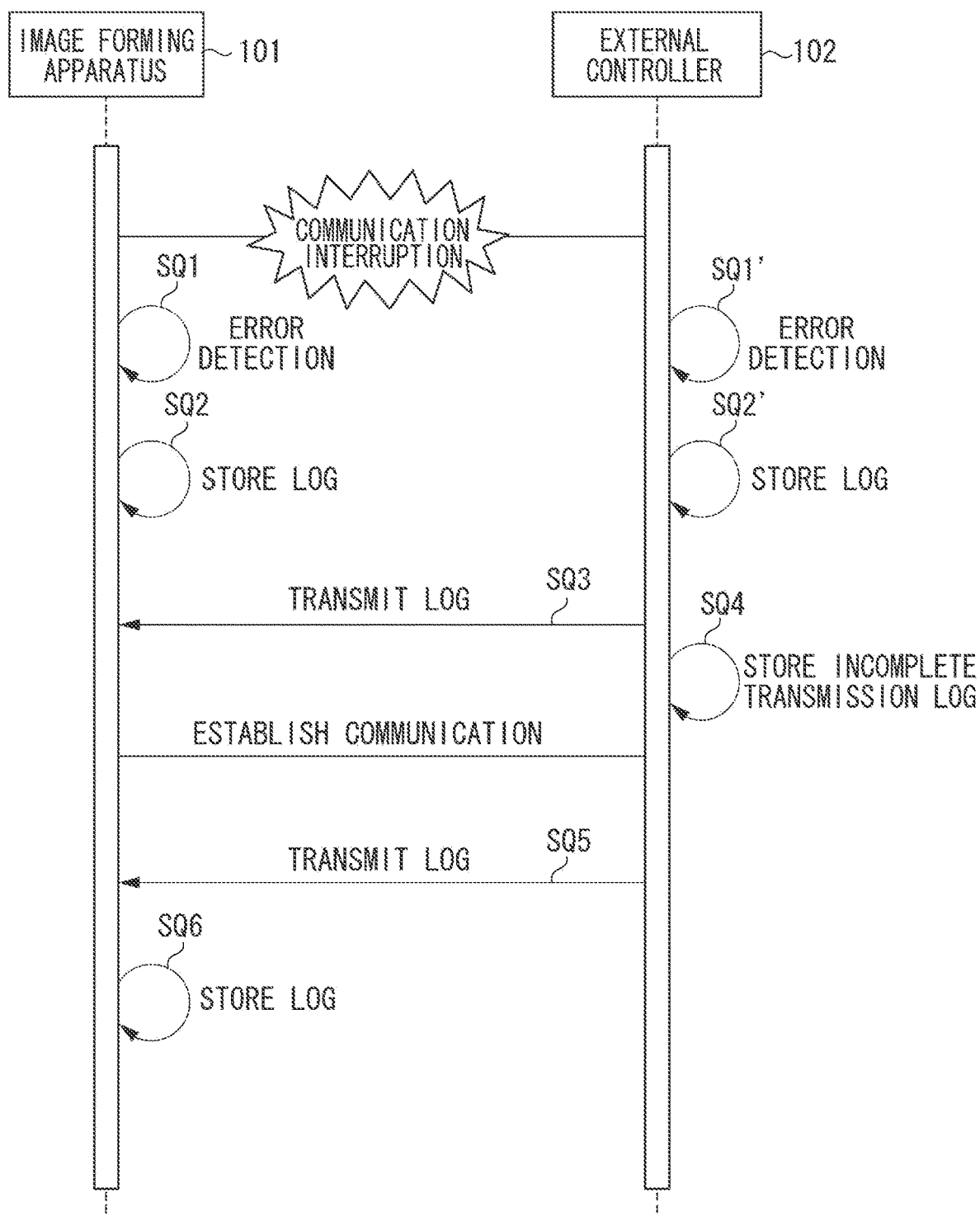
FIG. 14 is a sequence diagram illustrating an example of information processing executed in a case where communication is interrupted.

FIG. 14 is a sequence diagram illustrating an example of information processing executed when communication between the image forming apparatus 101 and the external controller 102 is interrupted. The processing described below is executed under a condition that the communication between the image forming apparatus 101 and the external controller 102 is interrupted after the image data is input to the image forming apparatus 101 by the external controller 102, to simplify the description.

In SQ1, the CPU 206 of the image forming apparatus 101 detects an error when the time-out period has elapsed after the reception of image data.

In SQ2, the CPU 206 stores a log in the HDD 205.

Similarly, in SQ1', the CPU 228 of the external controller 102 detects an error when the time-out period has elapsed after the reception of image data.

In SQ2', the CPU 228 stores a log in the HDD 227.

In SQ3, the CPU 228 transmits the log stored in SQ2' to the image forming apparatus 101. In the example illustrated in FIG. 14, the communication has been interrupted, and thus the log transmission in SQ3 fails.

Then, in SQ4, the CPU 228 stores as an incomplete transmission log the log that has failed to be transmitted, in the HDD 227.

In SQ5 after the communication between the image forming apparatus 101 and the external controller 102 is established, the CPU 228 transmits the incomplete transmission log to the image forming apparatus 101.

In SQ6, the CPU 206 of the image forming apparatus 101 that has received the log from the external controller 102 stores the log of the external controller 102 in the HDD 205 or the like.

Through this information processing, the log of the image forming apparatus 101 and the log of the external controller 102 are stored in the image forming apparatus 101. Thus, the image forming apparatus 101 stores the log information received from the external controller 102 and the log information indicating an operation of the image forming apparatus 101 corresponding to the timing at which a predetermined error has occurred in a storage unit of the image forming apparatus 101. In such a manner, the log information on the image forming apparatus 101 and the log information on the external controller 102 can be collectively checked. Thus, whether the error has occurred in communication between the image forming apparatus 101 and the external controller 102 is attributable to the image forming apparatus 101 or the external controller 102 can be identified simply by checking the log information stored in the image forming apparatus 101.

The image forming apparatus 101 may transmit the log information on the external controller 102 and the log information on the image forming apparatus 101, stored in the storage unit, to the management server 110 through a network. In such a manner, in the management server 110, the log information on the external controller 102 and the log information on the image forming apparatus 101 can be collectively checked. Thus, whether the error has occurred in communication between the image forming apparatus 101 and the external controller 102 is attributable to the image forming apparatus 101 or the external controller 102 can be identified in the management server 110 by simply checking the log information stored in the image forming apparatus 101.

The time-out period that is illustrated in FIG. 7 and involved in the determination in step S905 in FIG. 9 corresponds to and is the same as the time-out period that is illustrated in FIG. 10 and involved in the determination in step S1202 in FIG. 12. Thus, even in the state where the image forming apparatus 101 and the external controller 102 are both unable to communication with each other due to an occurrence of an error, both of the log of the image forming apparatus 101 and the log of the external controller 102 corresponding to the timing of the occurrence of the error can be reliably stored at the same time.

A second exemplary embodiment is described below. In the case described in the first exemplary embodiment, a print job input error is determined based on transmission/reception timeout of each print command. There are a number of other errors for which a log needs to be acquired in the image forming apparatus 101 and the external controller 102. In the second exemplary embodiment, logs are acquired in both of the image forming apparatus 101 and the external controller 102 even in a case where an error other than the timeout has occurred in the image forming apparatus 101 or the external controller 102, in addition to the configuration in the first exemplary embodiment.

In the second exemplary embodiment, the external controller 102 executes the job transmission processing in FIG. 9 as in the first exemplary embodiment. The image forming apparatus 101 executes the job reception processing illustrated in FIG. 12 as in the first exemplary embodiment. The external controller 102 executes the start processing illustrated in FIG. 13 as in the first exemplary embodiment.

Figure 15:
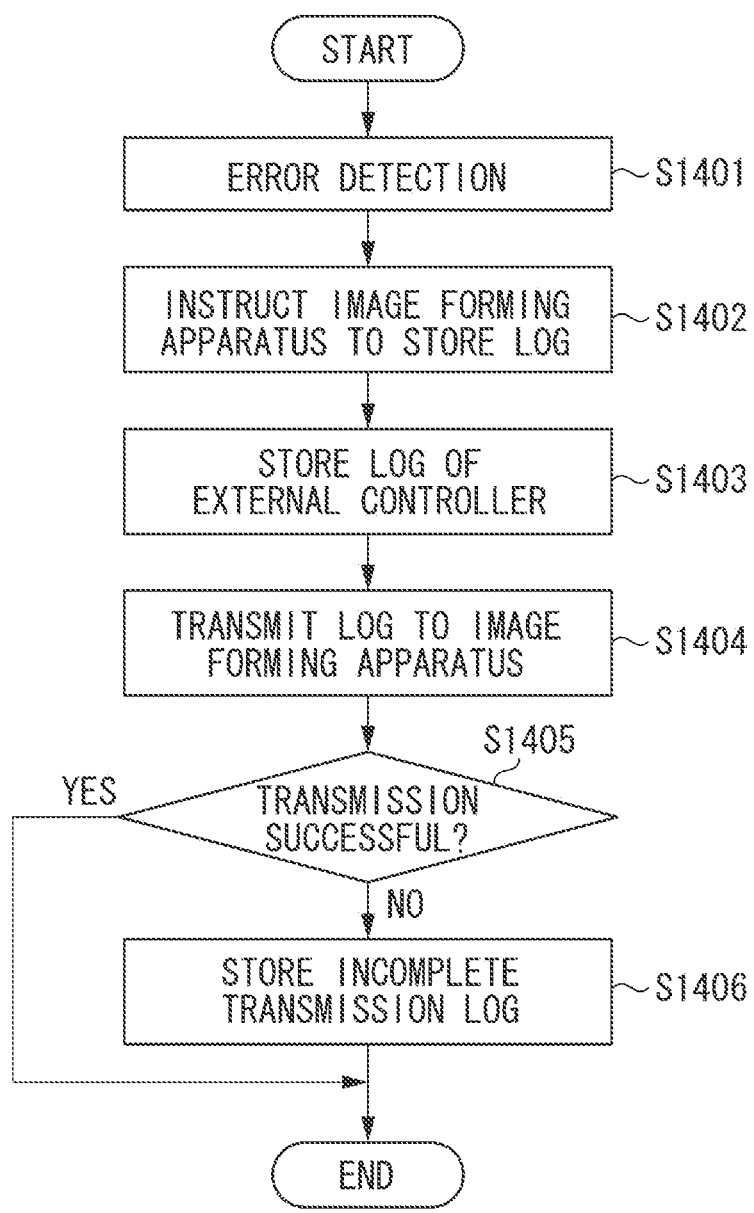
FIG. 15 is a flowchart illustrating an example of information processing executed when the external controller detects an error.

FIG. 15 is a flowchart illustrating an example of information processing executed by the external controller 102 when an error is detected, according to the second exemplary embodiment.

In step S1401, the CPU 228 detects an error in the external controller 102. An example of a type of the error detected in step S1401 includes an error in an analysis being executed on print data and a case where configuration information on the image forming apparatus 101 received from the image forming apparatus 101 is unexpected information. An error that has occurred in the external controller 102 alone may be related to processing executed by the image forming apparatus 101. Thus, the acquisition of the logs of both the image forming apparatus 101 and the external controller 102 at the time when an error has occurred in the external controller 102 is effective for the analysis on the cause of the error.

In step S1402, the CPU 228 issues a log storage instruction to the image forming apparatus 101. Upon receiving the log storage instruction issued in step S1402, the image forming apparatus 101 stores the log of the image forming apparatus 101 in the HDD 205.

In step S1403, the CPU 228 stores the log of the external controller 102 in the HDD 227.

In step S1404, the CPU 228 transmits the log stored in step S1403 to the image forming apparatus 101.

In step S1405, the CPU 228 determines whether the log transmission has been successfully completed in step S1404. When the CPU 228 determines that the transmission has been successfully completed in step S1405 (YES in step S1405), the error detection processing by the external controller 102 in FIG. 15 is terminated. On the other hand, when the CPU 228 determines that the transmission has failed in step S1405 (NO in step S1405), the processing proceeds to step S1406.

In step S1406, the CPU 228 stores as an incomplete transmission log the log that has failed to be transmitted, in the HDD 227, and the error detection processing illustrated in FIG. 15 is terminated.

Figure 16:
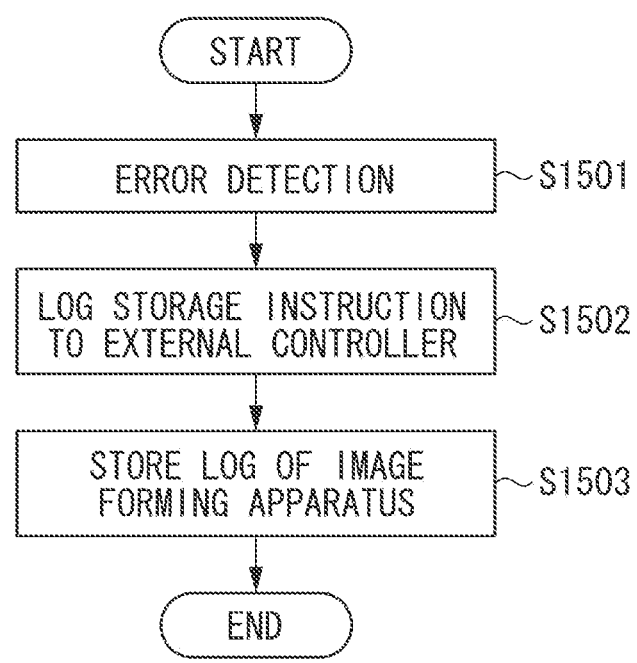
FIG. 16 is a flowchart illustrating an example of information processing executed when the image forming apparatus detects an error.

FIG. 16 is a flowchart illustrating an example of information processing executed by the image forming apparatus 101 when an error is detected, according to the second exemplary embodiment.

In step S1501, the CPU 206 detects an error in the image forming apparatus 101. Examples of a type of the error detected in step S1501 include a case where the print processing fails to be properly completed and a case where various unexpected commands are received from the external controller 102. An error has occurred in the image forming apparatus 101 alone may be related to processing executed by the external controller 102. Thus, the acquisition of the logs of both the image forming apparatus 101 and the external controller 102 at the time where an error has occurred in the image forming apparatus 101 is effective for the analysis on the cause of the error.

In step S1502, the CPU 206 issues a log storage instruction to the external controller 102.

In step S1503, the CPU 206 stores the log of the image forming apparatus 101 in the HDD 205, and the error detection processing by the image forming apparatus 101 illustrated in FIG. 16 is terminated.

Figure 17:
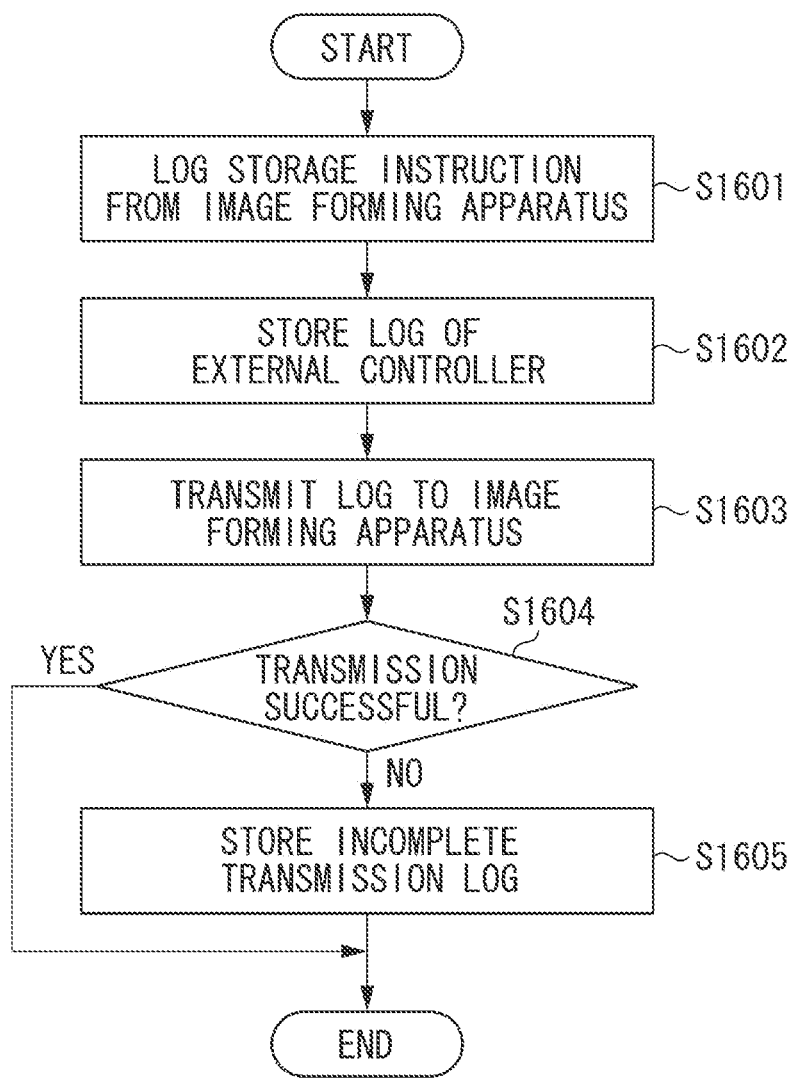
FIG. 17 is a flowchart illustrating an example of information processing executed by the external controller upon receiving a log storage instruction.

FIG. 17 is a flowchart illustrating an example of information processing executed by the external controller 102 upon receiving the log storage instruction from the image forming apparatus 101 in step S1502.

In step S1601, the CPU 228 receives a log storage instruction from the image forming apparatus 101.

In step S1602, the CPU 228 stores the log of the external controller 102 in the HDD 227.

In step S1603, the CPU 228 transmits the log stored in step S1602 to the image forming apparatus 101.

In step S1604, the CPU 228 determines whether the log transmission in step S1603 has been successfully completed. When the CPU 228 determines that the log transmission has been successfully completed (YES in step S1604), the processing for receiving the log storage instruction in FIG. 17 is terminated. On the other hand, when the CPU 228 determines that the log transmission has failed (NO in step S1604), the processing proceeds to step S1605.

In step S1605, the CPU 228 stores as an incomplete transmission log the log that has failed to be transmitted, in the HDD 227, and the error detection processing in FIG. 17 is terminated.

FIG. 18 is a flowchart illustrating an example of information processing executed by the image forming apparatus 101 upon receiving the log storage instruction issued in step S1402 from the external controller 102.

In step S1801, the CPU 206 receives a log storage instruction from the external controller 102.

In step S1802, the CPU 206 stores a log of the image forming apparatus 101 in the HDD 205.

Effect of Second Exemplary Embodiment

The second exemplary embodiment can achieve an effect that logs of the image forming apparatus 101 and of the external controller 102 at a time when an error, which is different from the print command transmission/reception timeout, has occurred can both be stored in addition to the effect achieved by the first exemplary embodiment.

Other Exemplary Embodiments

In the examples described in the first and the second exemplary embodiments, the log of the external controller 102 is transmitted to the image forming apparatus 101, and both of the logs of the external controller 102 and of the image forming apparatus 101 are stored in the image forming apparatus 101. Alternatively, the log of the image forming apparatus 101 can be transmitted to the external controller 102, and both of the logs of the external controller 102 and of the image forming apparatus 101 can be stored in the external controller 102. Furthermore, the logs of the external controller 102 and of the image forming apparatus 101 can both be transmitted to and stored in an external log server different from the external controller 102 or the image forming apparatus 101.

In the examples described in the first and the second exemplary embodiments, a log that has failed to be transmitted from the external controller 102 to the image forming apparatus 101 is retransmitted the next time the external controller 102 is started as in FIG. 13. The timing to retransmit the log is not limited to the timing at which the external controller 102 is started. For example, the retransmission of the log can be executed immediately after the log transmission until the transmission is successfully completed or can be executed at an arbitrary timing.

The exemplary embodiments of the present invention are described above in detail. However, the present invention is not limited to such particular exemplary embodiments described above. For example, the hardware configurations of the image forming apparatus 101 and the external controller 102 illustrated in FIG. 2 are merely examples. The image forming apparatus 101 and the external controller 102 may be communicably connected with each other through a plurality of I/Fs other than the I/Fs illustrated in FIG. 2. The image forming apparatus 101 and the external controller 102 may each include a plurality of CPUs, memories, and the like.

The external controller described above may be referred to as an image processing controller, a digital front end (DFE), a print server, or the like. The image forming apparatus may be referred to as a multifunction peripheral (MFP).

With the processing according to the exemplary embodiments described above, both of logs of the image forming apparatus and of the external controller at a time when an error has occurred can be reliably stored.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus which receives print data from an external controller, and performs printing based on the print data, wherein the image forming apparatus is able to communicate with a log storage server via a network, and wherein the external controller is able to communicate with the log storage server via the network, the image forming apparatus comprising:
    a receiver that receives, from the external controller, transmission log information on a transmission error of the print data which is to be transmitted from the external controller to the image forming apparatus; and
    a storage that stores the transmission log information received from the external controller,
    wherein the image forming apparatus transmits the transmission log information to the log storage server via the network, and
    wherein the transmission log information is transmitted from the external controller based on a booting of the external controller after the transmission error occurs.

2. The image forming apparatus according to claim 1, wherein the external controller does not transmit the transmission log information to the log storage server via the network.

3. The image forming apparatus according to claim 1, wherein the image forming apparatus further transmits print log information to the log storage server via the network.

4. The image forming apparatus according to claim 1, further comprising:
    a display that displays an error when reception of the print data is not completed before a predetermined time has passed since the image forming apparatus starts to receive the print data.

5. The image forming apparatus according to claim 4, wherein the display further displays a message urging a booting of the image forming apparatus when reception of the print data is not completed before a predetermined time has passed since the image forming apparatus starts to receive the print data.

6. The image forming apparatus according to claim 1, wherein the transmission log information on the transmission error is generated by the external controller.

7. A log transmission method in an image forming apparatus which receives print data from an external controller, and performs printing based on the print data, wherein the image forming apparatus is able to communicate with a log storage server via a network, and wherein the external controller is able to communicate with the log storage server via the network, the log transmission method comprising:
    receiving, from the external controller, transmission log information on a transmission error of the print data which is to be transmitted from the external controller to the image forming apparatus;
    storing, in a storage of the image forming apparatus, the transmission log information received from the external controller; and
    transmiting, to the log storage server, the transmission log information via the network,
    wherein the transmission log information is transmitted from the external controller based on a booting of the external controller after the transmission error occurs.

8. A non-transitory computer readable storage medium storing a computer program for controlling an image forming apparatus which receives print data from an external controller, and performs printing based on the print data, wherein the image forming apparatus is able to communicate with a log storage server via a network, and wherein the external controller is able to communicate with the log storage server via the network, the computer program comprising instructions, which when executed by one or more processors of the image forming apparatus, cause the image forming apparatus to:
    receive, from the external controller, transmission log information on a transmission error of the print data which is to be transmitted from the external controller to the image forming apparatus;
    store, in a storage of the image forming apparatus, the transmission log information received from the external controller; and
    transmit, to the log storage server, the transmission log information via the network,
    wherein the transmission log information is transmitted from the external controller based on a booting of the external controller after the transmission error occurs.

* * * * *